June 4, 1968  L. S. WASSERMAN ET AL  3,386,458
INTERNALLY ACTUATED COMBINED OXYGEN PRESSURE REGULATOR AND
OXYGEN-AIR DILUTION VALVES FOR RESPIRATORY APPARATUS
Filed June 18, 1965  3 Sheets-Sheet 1

INVENTORS
LEE S. WASSERMAN
ADAM J. STOLZENBERGER

BY Harry A. Herbert Jr
Charles H. Wagner
ATTORNEYS

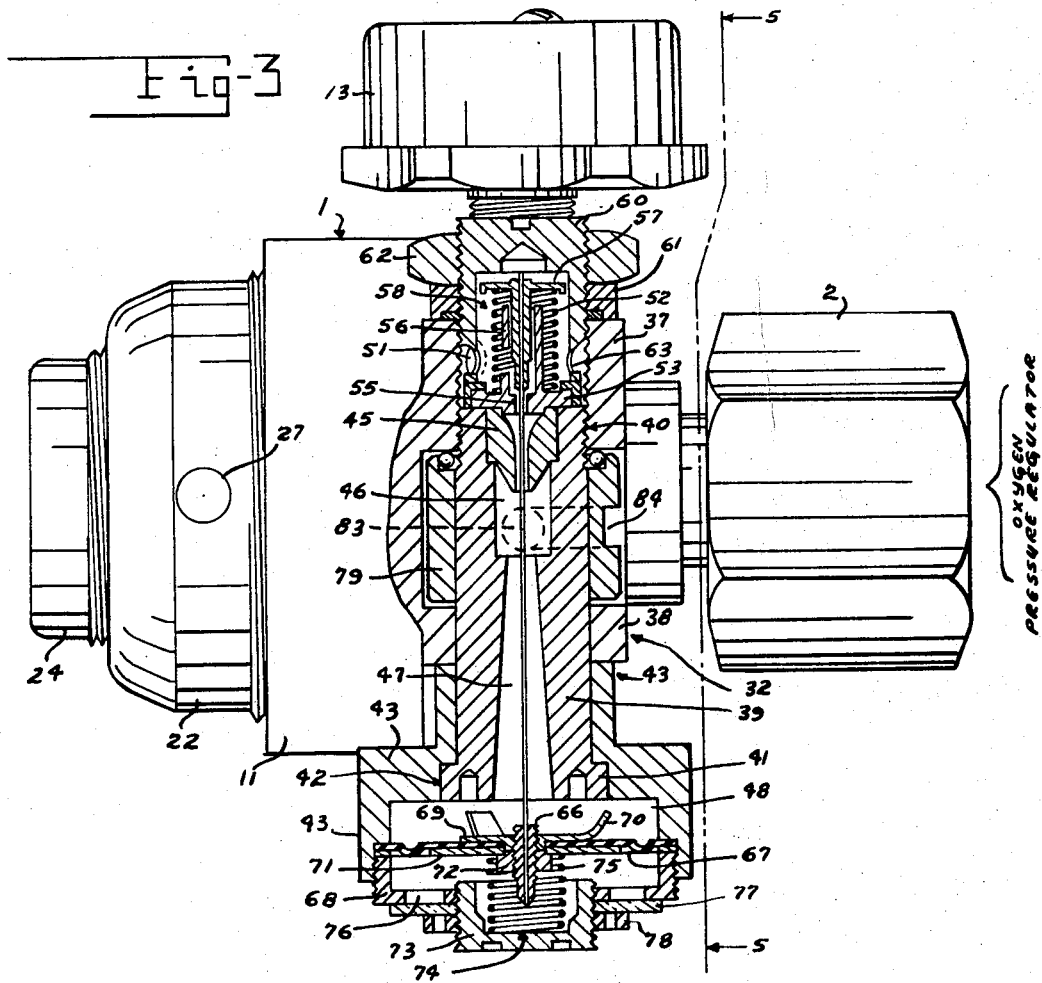

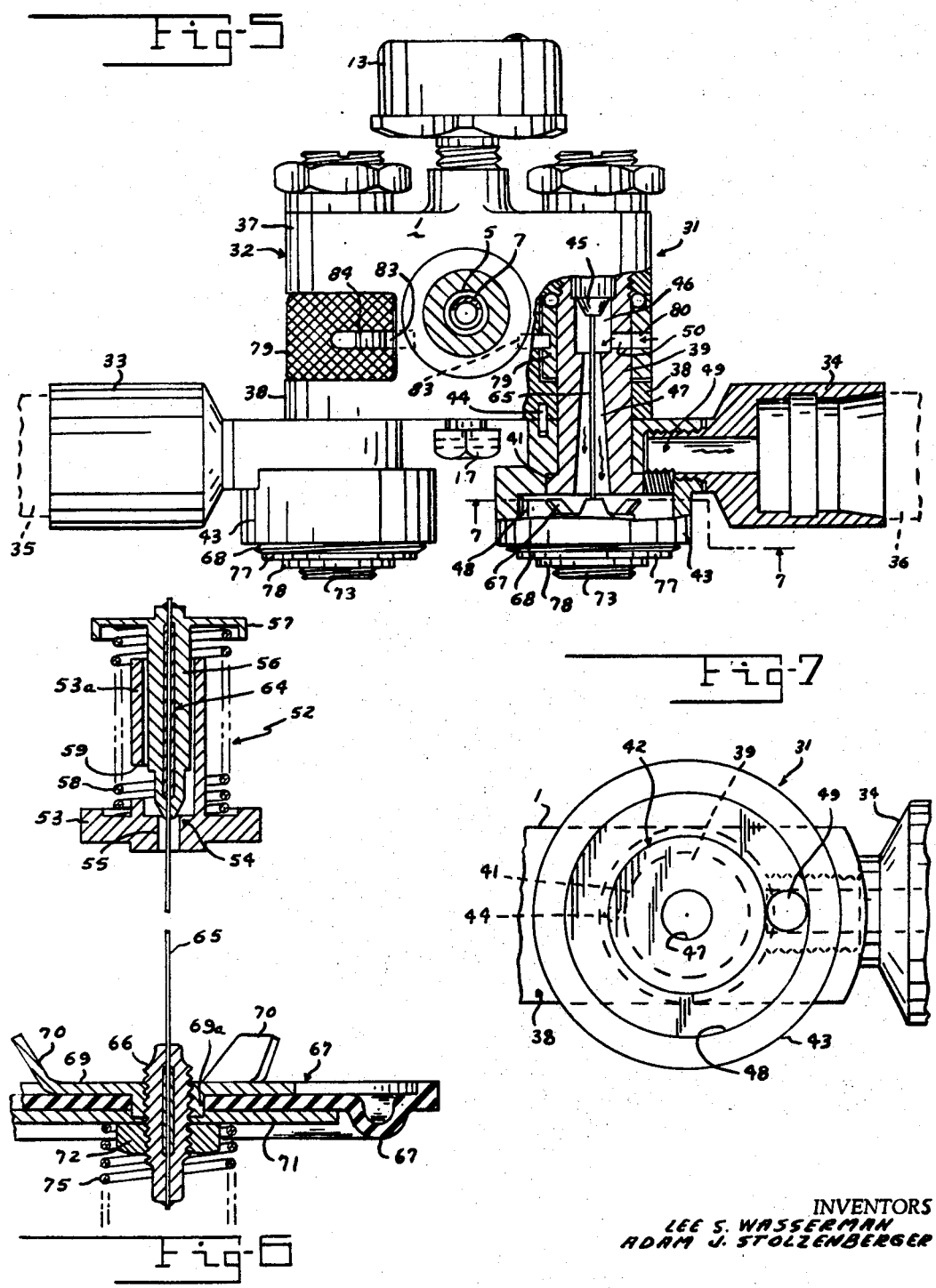

United States Patent Office 3,386,458
Patented June 4, 1968

3,386,458
INTERNALLY ACTUATED COMBINED OXYGEN PRESSURE REGULATOR AND OXYGEN-AIR DILUTION VALVES FOR RESPIRATORY APPARATUS
Lee S. Wasserman and Adam J. Stolzenberger, Dayton, Ohio, assignors to the United States of America as represented by the Secretary of the Air Force
Filed June 18, 1965, Ser. No. 465,217
9 Claims. (Cl. 137—114)

ABSTRACT OF THE DISCLOSURE

An oxygen-air positive pressure dilute valve structure having an oxygen supply valve means in one end with a controlling pressure demand diaphragm structure in its opposite end which is controlled by the differential pressure which is supplied by the valve structure to a breathing face mask or a respiratory apparatus. An oxygen supply air dilute chamber is disposed between the supply valve means and the pressure demand diaphragm structure with a flexible positive actuator which extends through the air dilution chamber with one end thereof connected to the oxygen supply valve and the opposite end thereof adjustably connected to the pressure demand oxygen supply diaphragm. This actuator adjusts the oxygen control valve by displacements of the pressure demand diaphragm. The air dilution chamber has a diverging mixing tube which extends from the air dilution mixing chamber into the oxygen pressure demand diaphragm chamber with an outlet from the oxygen pressure demand diaphragm chamber which is connected to a breathing resuscitator, or oxygen breathing mask, or other oxygen consuming enclosure.

---

This invention relates to valves, and more particularly to small compact combined pressure regulator and air dilution valves for supplying oxygen and air to a plurality of respiratory apparatus, including masks, to supply a fluid, such as oxygen, at a constant pressure only slightly greater than atmospheric pressure and to function properly including adjustable means for diluting the supplied fluid, such as oxygen with atmospheric air in accordance with the outside pressures, for instance at different predetermined altitudes. An air-oxygen mixing or oxygen dilute valve for this purpose is shown in the Patent 2,897,833 to Henry W. Seeler, dated Aug. 4, 1959.

An object of this invention is the provision of a smaller, more compact, combined pressure regulator and oxygen-air dilution valve structure which is suitable for oxygen-air dilution breathing supply means, such as for pressure breathing of pilots and aviation personnel at high altitudes, and in connection with aviation pressure suits or garments.

A further object is the provision of an oxygen diluter valve and structure which is small, simple, compact and positive with no exterior piping.

A further object includes an oxygen-air, positive pressure dilute valve structure having an oxygen supply valve means in one end and a controlling pressure diaphragm structure in the opposite end, controlled by the differential pressures between pressure as supplied to a face mask or respiratory apparatus and the oxygen supply pressure, including an oxygen supply and air dilution chamber there between, with a flexible positive actuator extending through the air dilution chamber with one end connected to the oxygen supply valve and its opposite end adjustably connected to a pressure demand oxygen supply diaphragm, for adjusting the oxygen control valve by the displacements of the diaphragm.

A further object of the invention includes a compact valve structure having an air dilution and mixing chamber with an outwardly diverging mixing tube extending toward and into the diaphragm chamber, with an outlet from said diaphragm chamber for delivering a variable oxygen-air mixture to a connected breathing resuscitator and mask or other oxygen-air consuming enclosure.

A further object is the provision of a compact adjustable oxygen pressure reduction and oxygen and air diluter structure, including a combined oxygen pressure control valve and pressure control diaprhagm units which include oxygen and air mixing or dilution chambers which are removable as units without dismantling or disturbing the ratio adjustments thereof and are individually adjustable to vary the oxygen-air ratio.

Other objects and advantages of the invention will become apparent from the following description and accompanying drawings in which like reference characters refer to like parts in the several figures, in which:

FIG. 1 is an enlarged elevation view, having a portion of the oxygen pressure regulator diaphragm and closure cap therefore broken away to show the oxygen supply channels and passages in the bottom of the pressure regulator diaphragm chamber leading to the two individual oxygen supply and air dilution valve structures;

FIG. 2 is a sectional view taken about on plane indicated by line 2—2 of FIG. 1, looking in the direction of the arrows;

FIG. 3 is a partial sectional view, taken about on line 3—3 of FIG. 1, looking in the direction of the arrows;

FIG. 4 is a side view of the improved pressure regulator air dilution and oxygen demand device, shown in relative full or actual size, looking also in the direction of the arrow 4 in FIG. 1;

FIG. 5 is a sectional view taken about on the planes indicated by line 5—5 in FIG. 2, parts of the casing being broken away to show a portion of the interior of the air dilution valve structural (at right angles to the air dilution valve structure as shown in section in FIG. 3, and on a slightly reduced scale);

FIG. 6 is a much enlarged fragmentary detail sectional view of the oxygen air dilution valve structure or unit of the invention, part of the oxygen admission valve pull wire being broken away and foreshortened; and FIG. 7 is an enlarged fragmentary sectional view, taken about on line 7—7 of FIG. 5, looking in the direction of the arrows.

Referring first to FIG. 4, the combined adjustable oxygen pressure regulator and oxygen supply and air dilution valve structure comprises a main body or casing 1 having a central or intermediate oxygen supply coupling 2, best seen in FIG. 2, adapted to be connected to the usual oxygen pressure supply reservoir or tank through the usual preliminary pressure regulator (not shown) supplying oxygen to the oxygen delivery chamber 3 at a predetermined regulated pressure under control of a pressure regulator valve 4, through the passage 5 and filter 6.

The valve 4 is urged to seating or closing position on its seat 8 by a coil spring 7, to control the rate of flow of oxygen (or other fluid) through the smaller passage 9 into one side 10 of the pressure regulator diaphragm chamber 11.

The oxygen delivery chamber 3 is provided with a lateral passage 12 disposed in communication with a conventional fluid pressure gauge 13 while the diaphragm chamber 10 has a passage 14 leading therefrom to a safety relief chamber 15 having a blowout diaphragm 16 secured in place therein by a removable vented plug or stud 17.

The oxygen pressure control valve 4 preferably has a plastic conical valve extremity surrounding an actuating pin or rod 18 which extends through the passage 9 with its outer extremity bearing on a metallic contact plate 19 mounted on the adjacent face of large flexible pressure diaphragm 20, which is backed up by the metallic diaphragm plate 21, the diaphragm 20 being sealed in place by a pressure regulator cap member 22 having a central threaded opening 23 in which the adjustable pressure regulating spring cap 24 is threadably received. The cap 24 has an internal spring seat plate 25. An oxygen pressure regulator coil spring 26 has its inner end impinging the metal diaphragm plate 21 and its outer end impinging the spring seat plate 25.

The larger or diaphragm chamber closure cap 22 is vented at 27 to atmosphere, thus, when oxygen under high pressure admitted into the chamber 10 by the valve 4 equals, or exceeds, the adjusted regulator spring pressure the diaphragm 20 (see FIG. 2) is displaced to the left to relieve pressure on the pin 18 to allow the valve 4 to close the passage 9 at the valve seat 8, under the influence of the lighter spring 7.

Removal of the coupling 2 releases the valve guide 28 for removal, also removal of the filter plug 6 may permit removal of the valve 4 and its spring 7 for replacement.

The base of the diaphragm chamber 10 is cored to provide a substantially U shape channel 29 leading from the central oxygen delivery passage 9 to passages or openings 30 in the body 1 as seen in FIG. 1 leading into the upper ends of the two spaced oxygen supply and demand air dilution valve chambers 52 in the body 1, at each side of the central pressure regulator chamber 3, these air dilution oxygen supply chamber structures being indicated generally at 31 and 32, and have oxygen and air delivery couplings 33 and 34 for delivery of the oxygen, or an oxygen and air mixture to suitable conventional breathing regulators or respiratory apparatus for face masks (not shown) through the connected conduits 35 and 36, as seen more particularly in FIGS. 1 and 5. The oxygen and air dilution valve structures 31 and 32 are identical and are mounted in parallel passages or bores in the body 1, as best seen in FIGS. 3, 5, 6 and 7.

Being identical, only one unit will be described in detail and similar reference numerals will be used on similar exposed parts in both of these valve structures 31 and 32.

The body 1 is provided spaced arms 37 and 38 for receiving the tubular valve bodies 39, best seen in FIG. 3.

Each of the upper arms 37 is threaded at 40 to receive the threaded upper ends of the tubular valve bodies 39 while the lower ends of the bodies 39 are flanged at 41 to seat in the circular recesses 42 in the base of the diaphragm chambers 43, the diaphragm chamber units being drawn upwardly (as seen in FIG. 3) in position against the lower surfaces of the lower arms 38 of the valve bodies 1 by the heads 41 of the valve bodies 39, dowel pins 44, as seen in FIG. 5, prevent rotation of the diaphrgam chambers 43 on the bodies 39.

Each valve body 39 is recessed at its upper end and receives an oxygen jet nozzle 45 which is seated in the top of an oxygen and air mixing chamber 46 which has a downwardly diverging (conical), sort of venturi mixing outlet passage 47, opening into the top 48 of the lower diaphragm chamber 43, the diaphragm chamber 48 having an outlet passage 49 leading into the oxygen, or oxygen and air delivery coupling 34 (a similar structure leads into the other coupling 33).

Air is admitted or drawn into the chamber 46 through a lateral passage 50 while oxygen is admitted, under control of pressure regulator shown in FIG. 2 into the upper end of the threaded bore 40 through the openings 30 and passages 51 above the oxygen pressure valve structure 52 (best seen in FIG. 6), which comprises a valve seat plate 53 having a valve seat 54 with an oxygen discharge passage 55 leading therefrom into the jet nozzle 45, and adapted to be closed by the elongated valve member 56 which has an upper spring seat flange 57 and the light compression spring 58. The valve 56 is suitably guided by the guide sleeve portion 53a which has an inlet port or opening 59 adjacent the plate 53.

The plate 53 is securely seated on the top end of the valve body 39 and the jet nozzle insert 45 by the cap member 60, as shown in FIG. 3. A pressure sealing gasket 61 and securing nut 62 is threaded on the cap 60 to prevent oxygen leakage.

The lower end of the cap 60 is channeled and apertured at 63 to admit oxygen from the passage (or passages) 51 through the cap 60 adjacent the lower end of the valve member 56 and its seat 54.

The oxygen control valve member 56 has a central small bore 64 therethrough in which is secured a small pull wire 65 (such as music wire), which extends downwardly through the chamber 46 and passage 47 into the lower diaphragm chamber 43 where it is secured in a small elongated threaded sleeve 66 which is axially adjustable in a diaphragm member 67, clamped in position, as shown in FIG. 3, by the lower diaphragm cap or cover 68.

The diaphragm member 67 includes an upper metallic plate 69 having a threaded hub portion 69a receiving the pull rod sleeve 66, and has upstanding stop fingers 70 limiting upward deflection of the diaphragm (and oxygen valve 56), and a lower clamping plate 71, the diaphragm being clamped between the plates 69 and 71 by the clamping nut 72.

The threaded pull rod sleeve 66 may therefore be axially adjusted in the diaphragm member 67 as desired, to adjust the distance between the diaphragm member 67 and the oxygen valve member 56, in other words, to adjust the effective length of the pull wire 65.

The diaphragm chamber closure cap 68 is centrally threaded to receive an adjusting closure cap 73 having an internal spring seat 74 forming a seat for the light coil compression coil spring 75. The other end of this spring is seated against the lower clamping diaphragm plate 71.

Pressure in the diaphragm chamber 48 against the upper surface of the diaphragm pulls the pull rod or wire 65 downwardly to close the oxygen valve 56, while the expansion of the two light coil springs 58 and 75 tends to counteract this pressure on the diaphragm member 67, or raise the valve 56 off its seat 54 upon predetermined reduction of pressure in the diaphragm chamber 10 to permit oxygen under pressure, as determined by the pressure regulator (see FIG. 2) to flow through the jet nozzle 45 and the mixing chamber 46 into the diverging passage 47 and out through the opening 49 and the coupling 34 to the resuscitator and face mask (not shown) or other desired delivery source, and a flow of air through the air inlet opening 50 is induced by the oxygen jet action, where it is mixed at 46 and 47 with the oxygen to provide air dilution of the released oxygen, as required, as it is discharged from the device through the couplings 34.

The lower closure cap 68 for the diaphragm chamber 48 is vented at 76 and covered by a nylon or plastic disk 77, held in place by a jam nut 78, to prevent accidental rotation of the adjustable spring seating cap 73.

Means are provided to vary the dilution of the oxygen supplied through the jet nozzle 45 with outside air. In other words, diluting the oxygen supplied to the user with air as required, according to different altitudes.

This oxygen diluting means includes a rotatable sleeve member 79, preferably of nylon and knurled, disposed between each of the arms 37 and 38 and surrounding the tubular valve body 39, and is formed with an air inlet opening 80 (as seen in FIG. 5) adapted to register with the opening 50 to admit maximum air into the mixing chamber 46. These openings 80 each have a laterally extending converging or triangular opening or slot 81, (as seen in FIG. 4) disposed to vary (or close) the effective air inlet are of the passage 50 into the mixing chamber 46, depending upon the rotation adjustment of the sleeve 79, as required for the oxygen-air dilution ratio.

This sleeve 79 is sealed at both ends against the surfaces of the arms as shown, and an O ring 82 is provided at one end for urging the other end in sealing relation, also providing sufficient friction so that the sleeve 79 will be frictionally retained in any selected adjusted position.

Rotative adjustment as shown is limited to about 90° between "FULL AIR DILUTION" and "100% OXYGEN" positions. To accomplish this a stop pin or lug 83 project into a 90% shallow circular groove 84 in the outer surface of each sleeve 79, arranged to dispose the opening 80 in full register with the opening 50 in one position and the opening 80 and slot 81 completely out of register with the opening 50 in the other, or 100% oxygen position.

Briefly describing the operation, oxygen from a high pressure oxygen source or tank (not shown) is supplied through a conventional pressure regulator (not shown) which is connected by the conduit 2a to the oxygen supply coupling 2.

Oxygen, as supplied under pressure (see FIG. 2) passes around the valve 4 and through the now open passage 9 since the diaphragm spring 26 deflects the diaphragm 20 to the right and the plate 19 thereon axially displaces the pin 18 to hold the valve 4 open until oxygen pressure in the chamber 10 compresses the spring 26, allowing the spring 7 to close or partly close the valve 4.

Oxygen passing into the chamber 10 is discharged along the channels or grooves 29 and through the openings 30, and 51 and 63 (FIGS. 1 and 3), into the cap member 60 where it passes through the openings or inlet ports 59, and past the oxygen demand valves 56 and passages 55 into the jet nozzle 45 where the oxygen is directed in a jet-like stream through the mixing chambers 46 and diverging tubular passages 47 into the demand diaphragm chambers 43 above the diaphragm members 67. The valves 56 at this time being held unseated by the light coil springs 58, and the diaphragms held deflected upwardly by the lower light coil springs 75 (FIG. 3) relieve pull tension on the pull or valve closing wires 65.

Oxygen passes out of the diaphragm chamber (see FIGS. 5 and 7) through the ports 49 into the couplings 34 where it is delivered to the respiratory apparatus and, or, resuscitators and breathing masks, as required.

As the pressure of the oxygen in the chambers 48 builds up the diaphragms 67 move downwardly to cause the pull wires 65 to exert downward closing pull on the oxygen valves 56 to reduce or close these valves according to the breathing requirements of the users masks which are connected to the couplings 33 and 34 through the flexible conduits 35 and 36.

While the chambers 43 below the diaphragms 67 are closed, the plastic or nylon disks 77 do not completely seal these chambers below the diaphragms so that they stabilize at substantially the outside or atmospheric (or cabin) pressures. Also the pull on the pull rods 65 by the diaphragms can be adjusted by changing the tension on the coil springs 75 by adjusting the spring seat caps 73, in or out.

At low altitudes where pure oxygen is not required or desired, the plastic or nylon sleeves 79 may be adjustably rotated to uncover, or partly uncover, the air dilution inlet ports 50 by registering the openings 80 or the tapered openings 81 (see FIG. 4) with the openings 50.

When this adjustment is made the jets of oxygen from the nozzle 45, passing through the mixing chamber 46 and diverging passage 47 produces a reduced or low pressure area in the mixing chambers 46 to draw in outside air through the passages 50 and 80, the amount of air dilution of the oxygen depending upon the rotative adjustment of the sleeve 79.

The oxygen or oxygen and air mixture passes downwardly into the diaphragm chambers 48 and out through passages 49 and couplings 33 and 34 into the conduits 35 and 36 leading to the respiratory apparatus or masks (not shown). Since the pressure against the diaphragm 67, deflecting the diaphragm downwardly, pulls the wire 65 downwardly against the compression of the spring 58, regulates the position of the valve 56 according to requirements, when less breathing mixture is required, pressure builds up in the diaphragm chamber 48 to cause the wire 65 to pull the valve 56 further closed, while a greater demand for oxygen allows the diaphragm to raise and to permit the spring 58 to open the oxygen supply valve further.

Adjustment of the oxygen control valves 56 relative to the positions of the diaphragms can be made through the lower threaded anchor sleeves 66 and nuts 72. The opening tension on the valves 56 can also be adjusted by the closure caps 73.

For purposes of exemplification a particular embodiment of the invention has been shown and described to the best understanding thereof. However it will be apparent that slight changes and modifications in the arrangement and construction of the parts thereof may be resorted to without departing from the true spirit and scope of the invention as defined in the following claims.

We claim:
1. In a combined fluid pressure regulator and pressure fluid delivery control device, a main body, an adjustable high pressure fluid reduction regulator therein adapted to be connected to a high pressure fluid source for delivering high pressure fluid therefrom at a predetermined lower pressure, pressure fluid delivery valve means disposed in laterally spaced parallel relation in said body at opposite sides of said adjustable high pressure fluid regulator and adapted to be connected to separate low pressure fluid dispensing means, said pressure fluid delivery valve means each comprising a pressure fluid inlet control valve for controlling said pressure fluid from said high pressure fluid regulator and a spaced lower pressure fluid delivery diaphragm chamber having a diaphragm responsive to the pressure in said chamber, said body having a communicating conduit between each of said pressure fluid inlet control valves and diaphragm chambers, valve spring means in said body for urging each of said pressure fluid inlet control valves toward open position, diaphragm spring means in said diaphragm chambers for selectively urging each of said diaphragms in a direction toward said pressure fluid inlet control valves in the direction of said inlet control valve opening movement, a flexible pull wire connection extending through each of said communicating conduits having one end fixed to one of said pressure fluid inlet control valves and its other end fixed to the diaphragm in one of said pressure fluid delivery diaphragm chambers, said pressure fluid delivery diaphragm chambers each having a low pressure fluid outlet conduit in communication therewith between the diaphragm therein and the said communicating conduit, for delivery of the pressure fluid at said lower fluid pressure to a source of consumption thereof, whereby a predetermined fluid pressure in each of said pressure fluid delivery diaphragm chambers between the diaphragm therein and said pressure fluid inlet control valves selectively deflects the diaphragms in a direction away from said pressure fluid inlet control valves to compress said diaphragm spring means and pull said pull wires to compress said pressure fluid inlet control valve spring means and pull said pressure fluid inlet control valves toward closed positions, and predetermined reduction in fluid pressure on said diaphragms in said pressure fluid delivery diaphragm chambers between said diaphragms and said pressure fluid inlet control valves permits deflection of said diaphragms in the opposite direction by said diaphragm spring means toward said fluid delivery control valve means to cause said pull wires to be slacked off, to permit said valve spring means to move said pressure fluid inlet control valves in a direction away from said diaphragm chambers to move said pressure fluid inlet control valves to open positions.

2. A fluid pressure regulator and adjustable pressure fluid delivery control device as set forth in claim 1 including means for adjusting the diaphragm deflecting force of said diaphragm spring means in each of said diaphragm chambers relative to the valve opening force of said pressure fluid inlet control valve spring means, for varying the pressure of the fluid in the diaphragm chambers between the diaphragms and said pressure fluid inlet control valves.

3. Apparatus as set forth in claim 2 including means for adjusting the lengths of the flexible pull wires between the pressure fluid inlet control valves and the diaphragms in each of said diaphragm chambers, for adjusting the positions of the last mentioned valves relative to the positions of the diaphragms.

4. A combined fluid pressure regulator and pressure fluid delivery control device as set forth in claim 3 in which said body includes an enlarged fluid mixing chamber in each of said communicating conduits adjacent said pressure fluid inlet control valve means and a diverging concentric passage extending therefrom toward said diaphragm chamber through which said pull wire extends, and is formed with a separate fluid inlet opening from the exterior of the control device into said enlarged fluid mixing chamber in each of said communicating conduits, and includes a concentric fluid jet opening in each of said communicating conduits between each of said pressure fluid inlet control valves and said enlarged fluid mixing chambers for directing a jet of fluid from said fluid inlet control valves concentrically through said enlarged fluid mixing chamber and said diverging concentric passage toward said diaphragm chamber, to induce an inflow of a separate fluid through said separate fluid inlet opening into said enlarged fluid mixing chamber, to cause mixing thereof with the fluid jetted through said jet opening and delivery thereof to said diaphragm chamber when said pressure fluid inlet control valve is opened, and including adjustable means on said body for adjusting the effective area of said separate fluid inlet opening to adjust the ratio of fluid induced through the fluid inlet opening to the fluid jetted through the jet opening.

5. A pressure fluid delivery control apparatus for controlling delivery of high pressure oxygen at a predetermined lower pressure to a source of consumption comprising, a body having an oxygen fluid inlet port, an oxygen delivery valve in said body in communication with said fluid inlet port, valve spring means in said body urging said oxygen delivery valve to open position, a diaphragm chamber formed in said body in concentric spaced relation to said oxygen delivery valve, said body having an oxygen delivery conduit formed therein extending concentrically in communication between said delivery valve and said diaphragm chamber, diaphragm spring means in said diaphragm chamber for deflecting said diaphragm in a direction toward said oxygen delivery valve, a flexible pull wire extending concentrically through said concentric oxygen delivery conduit, fixed at one end to said oxygen delivery valve and fixed at its opposite end to the center of said diaphragm, an oxygen outlet opening formed in said diaphragm chamber in communication with said oxygen delivery conduit between said diaphragm and said delivery valve, adapted to be connected to an oxygen consuming source.

6. In an oxygen-air dilution supply device for breathing masks, a main body, a pressure regulator therein adapted to be connected to a high pressure oxygen supply, oxygen-air dilution supply valve means disposed in said body in parallel relation at opposite sides of said pressure regulator, adapted to be connected to separate respiratory devices for supplying oxygen or an oxygen and air mixture to pressure breathing face masks, a fluid conduit connection between said regulator and said supply valve means, said oxygen-air dilution supply valve means each comprising an oxygen inlet control valve and an axially spaced concentric diaphragm chamber, and formed with an oxygen jet opening and an oxygen and air dilution mixing chamber and diverging concentric passage therefrom, extending away from said jet opening into said diaphragm chamber, inlet valve spring means in said body urging said inlet control valves toward open position to admit oxygen under pressure through said jet opening and said air dilution and mixing chamber and divering passage into said diaphragm chamber, a diaphragm in said diaphragm chamber responsive to pressures in said chamber, adjustable diaphragm spring means in said diaphragm chamber for flexing said diaphragm in a direction toward said oxygen inlet control valve opening movement, an air dilution inlet passage in said body in communication with said oxygen air dilution mixing chamber adjacent said jet opening, an oxygen and air mixture outlet passage formed in said body extending from said diaphragm chamber to the exterior adapted to be connected to a respiratory device for a breathing face mask for aviators, and a flexible nonstretchable elongated connector extending axially and concentrically through said oxygen and air dilution mixing chamber and diverging passage, having one end thereof concentrically fixed to said oxygen inlet control valve and its opposite end concentrically fixed to said diaphragm, whereby predetermined pressure in said diaphragm chamber deflects said diaphragm to pull said connector downwardly to compress said control valve spring means and said diaphragm spring means, and positively pull said inlet control valve toward closed position, and predetermined reduction in pressure in said diaphragm chamber, and in said diverging passage, permits said diaphragm spring means to deflect the diaphragm toward said control valve to slack off on the flexible nonstretchable connector and permit the inlet control valve spring means to move said inlet control valve toward open position.

7. A device as set forth in claim 6 in which said flexible nonstretchable connector is a pull wire which is axially adjustable in said diaphragm to vary the effective length of the pull wire between the oxygen inlet control valve and the diaphragm, for adjusting the position of the control valve in the body relative to the position of the diaphragm.

8. Apparatus as set forth in claim 7 including means for adjusting the compression of the diaphragm spring in the diaphragm chamber, relative to the position of the diaphragm in the diaphragm chamber.

9. A device as claimed in claim 8 in which said air dilution mixing chamber in the body includes an enlarged concentric air mixing and oxygen dilution chamber disposed between and in communication with said oxygen jet opening and said diverging concentric passage, and includes manually adjustable means for regulating the inlet area of said air dilution inlet passage to vary oxygen to dilution air mixture in said mixing chamber.

References Cited

UNITED STATES PATENTS

| | | | |
|---|---|---|---|
| 2,616,442 | 11/1952 | Holmes | 137—63 X |
| 2,897,833 | 8/1959 | Seeler | 137—63 X |
| 2,918,079 | 12/1959 | Krow | 137—505.12 X |

FOREIGN PATENTS

| | | |
|---|---|---|
| 623,558 | 5/1949 | Great Britain. |

WILLIAM F. O'DEA, *Primary Examiner.*

R. GERARD, *Assistant Examiner.*